(12) United States Patent
Sasaki

(10) Patent No.: US 10,197,871 B2
(45) Date of Patent: Feb. 5, 2019

(54) DISPLAY DEVICE AND DRIVE METHOD THEREFOR

(71) Applicant: SHARP KABUSHIKI KAISHA, Sakai, Osaka (JP)

(72) Inventor: Takashi Sasaki, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/555,865

(22) PCT Filed: Feb. 26, 2016

(86) PCT No.: PCT/JP2016/055772
§ 371 (c)(1),
(2) Date: Sep. 5, 2017

(87) PCT Pub. No.: WO2016/143550
PCT Pub. Date: Sep. 15, 2016

(65) Prior Publication Data
US 2018/0052352 A1 Feb. 22, 2018

(30) Foreign Application Priority Data
Mar. 6, 2015 (JP) ................. 2015-044335

(51) Int. Cl.
*G02F 1/1345* (2006.01)
*G09F 9/35* (2006.01)
*G09G 3/36* (2006.01)
*H04B 3/04* (2006.01)

(52) U.S. Cl.
CPC ............ *G02F 1/13452* (2013.01); *G09F 9/35* (2013.01); *G09G 3/3666* (2013.01); *G09G 3/3688* (2013.01); *H04B 3/04* (2013.01); *G09G 2310/027* (2013.01); *G09G 2310/0224* (2013.01); *G09G 2310/06* (2013.01); *G09G 2310/08* (2013.01); *G09G 2320/0223* (2013.01)

(58) Field of Classification Search
None
See application file for complete search history.

(56) References Cited

U.S. PATENT DOCUMENTS

2002/0126082 A1 9/2002 Matsuzaki

FOREIGN PATENT DOCUMENTS

| JP | H10-20833 A | 1/1998 |
| JP | 2000-341177 A | 12/2000 |
| JP | 2001-188517 A | 7/2001 |
| JP | 2006-106330 A | 4/2006 |
| JP | 2013-137423 A | 7/2013 |

*Primary Examiner* — Kenneth B Lee, Jr.
(74) *Attorney, Agent, or Firm* — ScienBiziP, P.C.

(57) ABSTRACT

A timing control circuit (1) and data line drive circuits (2a) to (2f) are connected in a multi-drop manner. When sending video data (VD) to the data line drive circuits (2a) to (2f), the timing control circuit (1) changes a transmission condition in accordance with a transmission distance between the timing control circuit (1) and a destination data line drive circuit. The timing control circuit (1) increases a transmission frequency as the transmission distance is shorter. The timing control circuit (1) may decrease a transmission signal amplitude as the transmission distance is shorter. With this, the video data (VD) is transmitted to the plurality of the data line drive circuits (2a) to (2f) in a suitable manner.

8 Claims, 11 Drawing Sheets

DISPLAY DEVICE AND DRIVE METHOD THEREFOR

TECHNICAL FIELD

The present invention relates to a display device, and especially to a display device which transmits video data from a control circuit to a plurality of data line drive circuits.

BACKGROUND ART

A display device includes a scanning line drive circuit and a data line drive circuit in order to drive a plurality of scanning lines and a plurality of data lines formed on a display panel. In a typical display device, the scanning line drive circuit sequentially selects the scanning lines based on a control signal output from a timing control circuit. The data line drive circuit applies voltages in accordance with video data to the data lines, based on a control signal and the video data output from the timing control circuit. The data line is also called a source line, a video signal line, or the like, and the data line drive circuit is also called a source line drive circuit, a source driver, a video signal line drive circuit, or the like.

In a liquid crystal display device, mini-LVDS (Low Voltage Differential Signaling) which is a multi-drop type data transmission system is widely used in order to transmit the video data from the timing control circuit to the data line drive circuit. FIG. 12 is a diagram showing a connection form of the timing control circuit and the data line drive circuit in a conventional liquid crystal display device using the mini-LVDS. The crystal display device shown in FIG. 12 includes two buses in order to transmit the video data from a timing control circuit 91 to six data line drive circuits 92a to 92f.

Relating to the invention of the present application, Patent Document 1 describes a module for a display device which inputs to an internal circuit with switching a sequence of input signals between an odd-numbered source driver and an even-numbered source driver (refer to FIG. 13). According to the module for the display device described in Patent Document 1, wiring is performed with respect to a plurality of source drivers connected in a multi-drop manner without making intersections of signal lines, thereby suppressing signal reflection and distortion of a signal waveform.

PRIOR ART DOCUMENT

Patent Document

[Patent Document 1] Japanese Laid-Open Patent Publication No. 2001-188517

SUMMARY OF THE INVENTION

Problems to be Solved by the Invention

The liquid crystal display device shown in FIG. 12 includes two buses in order to transmit the video data in compliance with the mini-LVDS. Therefore, output terminals of the timing control circuit 91 increases, and cost of the liquid crystal display device increases. Thus, there can be considered a method in which the number of the buses is reduced from two to one in order to reduce the cost, and a transmission frequency of the video data is increased in order to secure a transmission amount of the video data.

However, when the transmission frequency is increased, a signal waveform on the bus is distorted and a transmission error is likely to occur. Furthermore, in a multi-drop type data transmission system such as the mini-LVDS, when circuits connected to the bus increases, a transmission load increases. When the transmission load increases, the signal waveform on the bus is distorted and the transmission error is likely to occur, as in the case where the transmission frequency is increased.

In the module for the display device described in Patent Document 1, the distortion of the signal waveform can be suppressed to some extent, but the distortion can not be eliminated completely. Thus, it is necessary to determine the transmission frequency, considering the distortion of the signal waveform when the video data is transmitted to a data line drive circuit farthest from the timing control circuit (distortion under worst condition). Therefore, the transmission frequency can not be sufficiently increased by this method.

Accordingly, an object of the present invention is to provide a display device which can transmit video data in a suitable manner (for example, at high speed) to a plurality of data line drive circuits connected in a multi-drop manner.

Means for Solving the Problems

According to a first aspect of the present invention, there is provided a display device including: a display panel having a plurality of data lines; a control circuit configured to send video data; and a plurality of data line drive circuits configured to drive the data lines based on the video data received from the control circuit, wherein the control circuit and the data line drive circuits are connected in a multi-drop manner, and the control circuit is configured to change a transmission condition in accordance with a transmission distance between the control circuit and a destination data line drive circuit when sending the video data.

According to a second aspect of the present invention, in the first aspect of the present invention, the control circuit is configured to increase a transmission frequency as the transmission distance is shorter when sending the video data.

According to a third aspect of the present invention, in the first or second aspect of the present invention, the control circuit is configured to decrease a transmission signal amplitude as the transmission distance is shorter when sending the video data.

According to a fourth aspect of the present invention, in the first aspect of the present invention, the data line drive circuits are arranged along one side of the display panel, and the control circuit is configured to send the video data in accordance with an arrangement order of the data line drive circuits.

According to a fifth aspect of the present invention, in the fourth aspect of the present invention, the control circuit is configured to change the transmission condition monotonously within one horizontal period.

According to a sixth aspect of the present invention, in the fifth aspect of the present invention, the control circuit is configured to reverse a sending order of the video data every horizontal period.

According to a seventh aspect of the present invention, in the first aspect of the present invention, the control circuit is configured to change the transmission condition with respect to one or more data line drive circuits.

According to an eighth aspect of the present invention, in the first aspect of the present invention, the control circuit is configured to change the transmission condition while sending the video data to one data line drive circuit.

According to a ninth aspect of the present invention, in the first aspect of the present invention, the display panel is a liquid crystal panel.

According to a tenth aspect of the present invention, there is provided a drive method for a display device including a display panel having a plurality of data lines, and a control circuit and a plurality of data line drive circuits connected in a multi-drop manner, the method including the steps of: sending video data from the control circuit; receiving the video data by the data line drive circuits; and driving the data lines based on the video data received by the data line drive circuits, wherein in the sending, a transmission condition is changed in accordance with a transmission distance between the control circuit and a destination data line drive circuit.

Effects of the Invention

According to the first or tenth aspect of the present invention, when transmitting the video data from the control circuit to the plurality of the data line drive circuits, it is possible to select a suitable transmission condition in accordance with the transmission distance and transmit the video data in a suitable manner.

According to the second aspect of the present invention, it is possible to increase an average value of the transmission frequency and transmit the video data at high speed, by increasing the transmission frequency as the transmission distance is shorter.

According to the third aspect of the present invention, it is possible to decrease an average value of the transmission signal amplitude and transmit the video data with low power consumption, by decreasing the transmission signal amplitude as the transmission distance is shorter.

According to the fourth aspect of the present invention, for the display device which transmits the video data in accordance with the arrangement order of the data line drive circuits, the control circuit which sequentially changes the transmission condition in accordance with the transmission distance can be configured easily.

According to the fifth aspect of the present invention, it is possible to prevent the transmission condition from abruptly changing in the horizontal period, by changing the transmission condition monotonously within one horizontal period.

According to the sixth aspect of the present invention, the transmission condition is changed monotonously within one horizontal period, and the sending order of the video data is reversed every horizontal period. Therefore, it is possible to prevent the transmission condition from abruptly changing in a horizontal flyback period.

According to the seventh aspect of the present invention, transmission can be performed under a constant transmission condition for the data line drive circuit, by changing the transmission condition in unit of the data line drive circuit. Thus, an optimum transmission condition can be set for each data line drive circuit.

According to the eighth aspect of the present invention, it is possible to change the transmission condition in multi-stage and transmit the video data in a more suitable manner.

According to the ninth aspect of the present invention, effects of the first aspect can be attained in a liquid crystal display device including the liquid crystal panel.

MODES FOR CARRYING OUT THE INVENTION

First Embodiment

Figure 1:
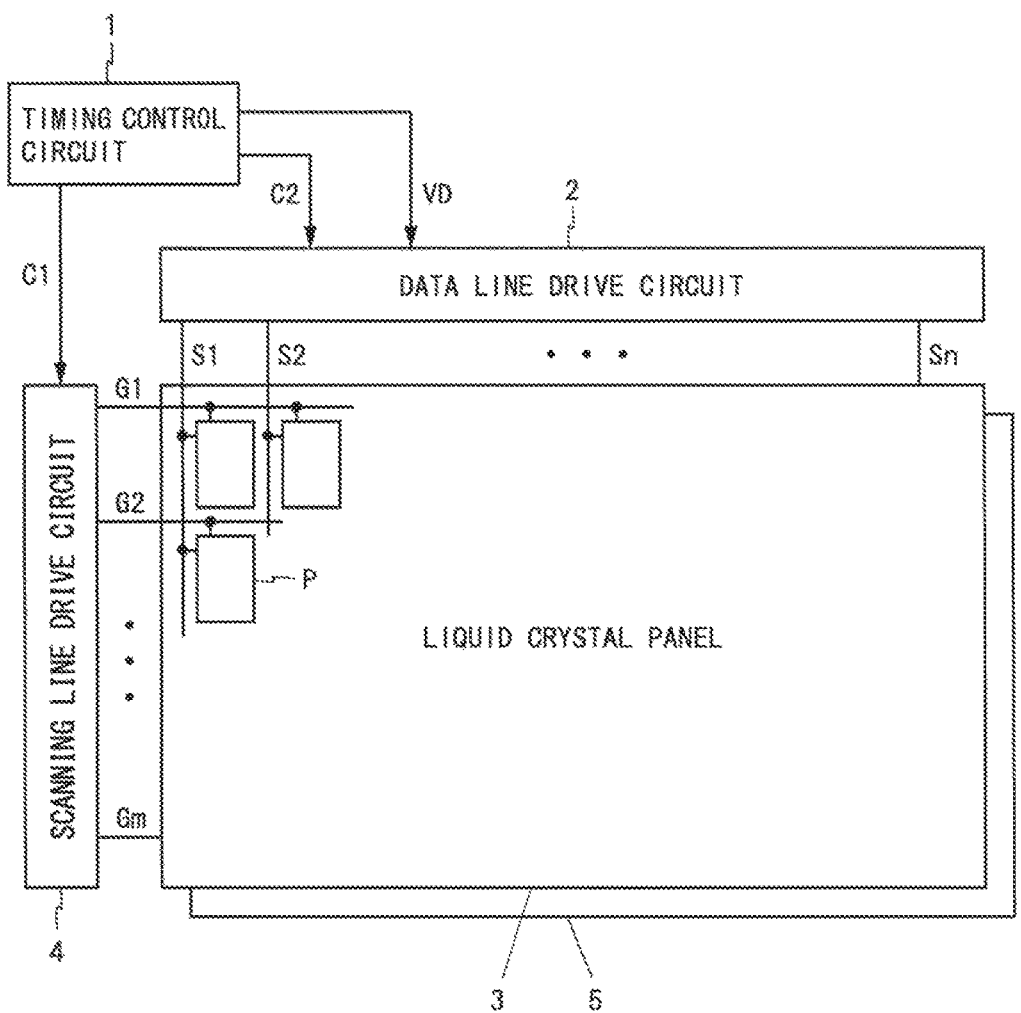
FIG. 1 is a block diagram showing a configuration of a liquid crystal display device according to each embodiment of the present invention.

FIG. 1 is a block diagram showing a configuration of a liquid crystal display device according to a first embodiment of the present invention. A liquid crystal display device shown in FIG. 1 includes a timing control circuit 1, a data line drive circuit 2, a liquid crystal panel 3, a scanning line drive circuit 4, and a backlight 5. Hereinafter, m and n are integers not less than 2.

The liquid crystal panel 3 includes m scanning lines G1 to Gm, n data lines S1 to Sn, and (m×n) pixels P. The scanning lines G1 to Gm are arranged in parallel to each other. The data lines S1 to Sn are arranged in parallel to each other so as to intersect with the scanning lines G1 to Gm perpendicularly. The scanning lines G1 to Gm and the data lines S1 to Sn intersect at (m×n) points. The (m×n) pixels P are arranged corresponding to the intersections of the scanning lines G1 to Gm and the data lines S1 to Sn. The pixel P is connected to one scanning line and one data line. The backlight 5 is provided on a back side of the liquid crystal panel 3 and irradiates a back surface of the liquid crystal panel 3 with light. Note that the liquid crystal display device may not be provided with the backlight 5.

The timing control circuit 1 outputs a control signal C1 to the scanning line drive circuit 4, and outputs a control signal C2 and video data VD to the data line drive circuit 2. The scanning line drive circuit 4 sequentially selects the scanning lines G1 to Gm based on the control signal C1. With this, n pixels P connected to the selected scanning line are selected collectively. The data line drive circuit 2 applies n voltages (hereinafter referred to as data voltages) in accordance with the video data VD to the data lines S1 to Sn, respectively, based on the control signal C2 and the video data VD. With this, the n data voltages are written to the selected n pixels P, respectively. Brightness (transmittance) of the pixel P changes in accordance with the data voltage written to the pixel P. It is possible to display a desired image on the liquid crystal panel 3, by writing the data voltages to the (m×n) pixels P using the data line drive circuit 2 and the scanning line drive circuit 4.

Figure 2:
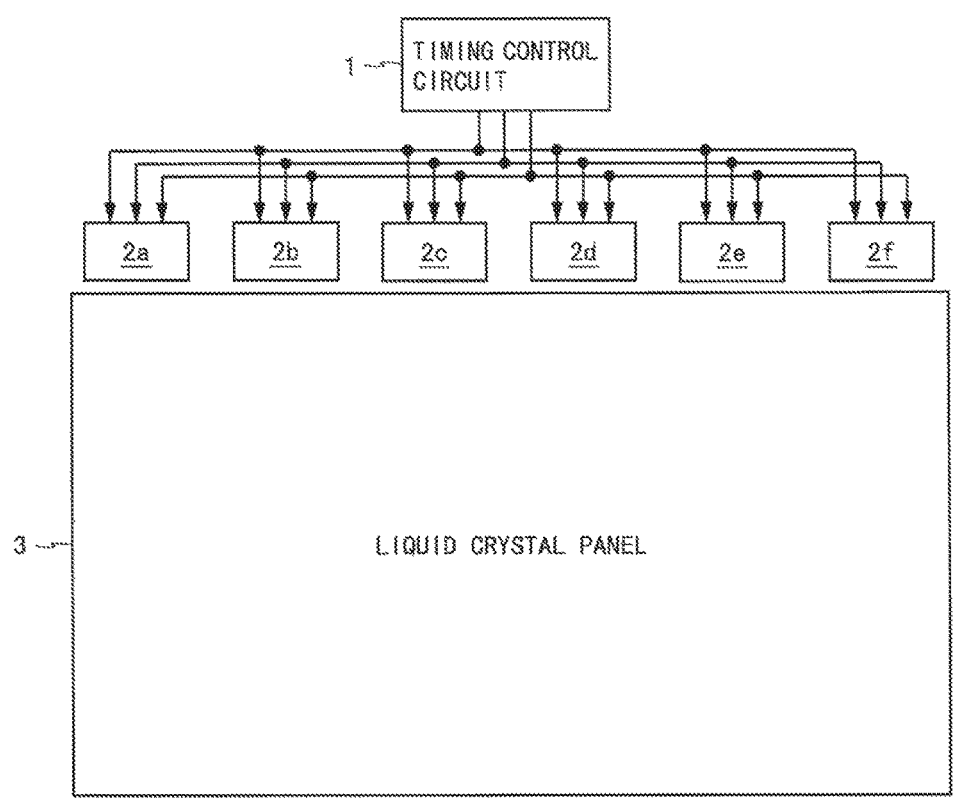
FIG. 2 is a diagram showing a connection form of a timing control circuit and data line drive circuits in a liquid crystal display device according to a first embodiment.

FIG. 2 is a diagram showing a connection form of the timing control circuit 1 and the data line drive circuit 2. As shown in FIG. 2, the data line drive circuit 2 consists of six data line drive circuits 2a to 2f, each being a semiconductor chip. The data line drive circuits 2a to 2f are arranged along one side (upper side in FIG. 2) of the liquid crystal panel 3. The timing control circuit 1 and the data line drive circuits 2a to 2f are connected to a bus in a multi-drop manner. The video data VD is transmitted from the timing control circuit 1 to the data line drive circuits 2a to 2f in compliance with the mini-LVDS.

In FIG. 2, the timing control circuit 1 is arranged in a neighborhood of one symmetry axis (not shown) of the liquid crystal panel 3. Hereinafter, a transmission distance (length of bus wiring) between the timing control circuit 1 and the data line drive circuits 2a to 2f is referred to as L. Among the data line drive circuits 2a to 2f, the data line drive circuits 2c, 2d have a shortest transmission distance L, and the data line drive circuits 2a, 2f have a longest transmission distance L. A signal waveform on the bus is more distorted as the transmission distance L is longer. Thus, the signal waveform of the video data VD sent from the timing control circuit 1 is not distorted so much when the signal reaches the data line drive circuit 2c or 2d, but it is distorted to some extent when the signal reaches the data line drive circuit 2a or 2f. Therefore, in order for the data line drive circuits 2a to 2f to correctly receive the video data VD, it is necessary to determine a transmission condition (transmission frequency, transmission signal amplitude, or the like) of the video data VD, with prospecting in advance that the signal waveform on the bus is distorted.

Figure 3:
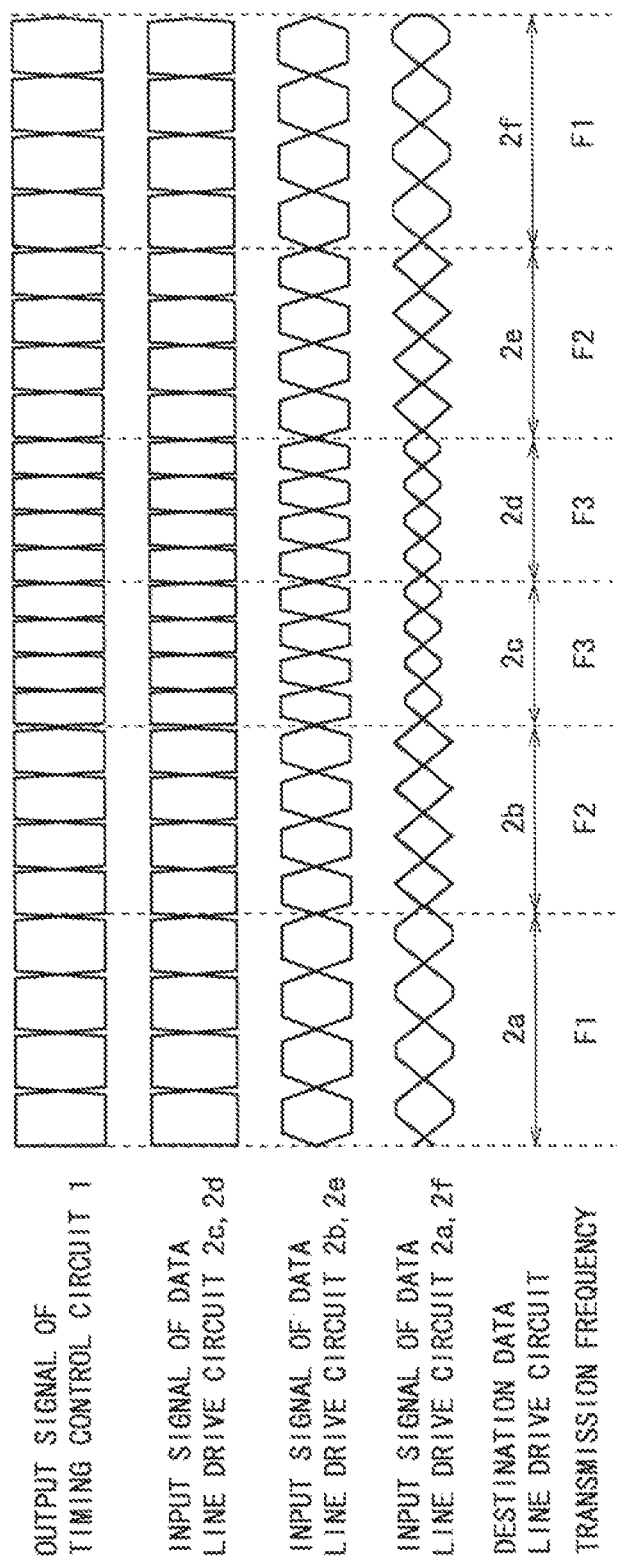
FIG. 3 is a waveform diagram of signals on a bus in the liquid crystal display device according to the first embodiment.

FIG. 3 is a waveform diagram of signals on the bus in the liquid crystal display device according to the present embodiment. FIG. 3 schematically describes changes of the signals on the bus within one horizontal period. The signals on the bus include a clock signal and a data signal. As shown in FIG. 3, the timing control circuit 1 sends the video data VD in an ascending order (in order of 2a, 2b, . . . , 2e, 2f) in accordance with an arrangement order of the data line drive circuits 2a to 2f. When sending the video data VD, the timing control circuit 1 changes the transmission condition in accordance with the transmission distance L between the timing control circuit 1 and a destination data line drive circuit. In the example shown in FIG. 3, the timing control circuit 1 increases a transmission frequency as the transmission distance L is shorter, and decreases the transmission frequency as the transmission distance L is longer. Specifically, when sending the video data VD to the data line drive circuit 2a or 2f having the longest transmission distance L, the timing control circuit 1 sets the transmission frequency to a low value F1. When sending the video data VD to the data line drive circuit 2c or 2d having the shortest transmission distance L, the timing control circuit 1 sets the transmission frequency to a value F3 higher than F1. When sending the video data VD to the remaining data line drive circuit 2b or 2e, the timing control circuit 1 sets the transmission frequency to a value F2 between F1 and F3 (F1<F2<F3). In this manner, the timing control circuit 1 changes the transmission frequency with respect to one data line drive circuit.

In the liquid crystal display device according to the present embodiment, when sending the video data VD to the data line drive circuit 2c or 2d, a high transmission frequency F3 is used. At this time, the signal waveform of the video data VD may be distorted to an extent so that the data line drive circuits 2a, 2f can not receive the video data VD correctly. However, it is not necessary for the data line drive circuits 2a, 2f to correctly receive the video data VD sent to the data line drive circuit 2c or 2d. Even if the data line drive circuits 2a, 2f can not correctly receive the video data VD sent to the data line drive circuit 2c or 2d, there are no problems and the liquid crystal display device can display an image correctly.

Figure 4:
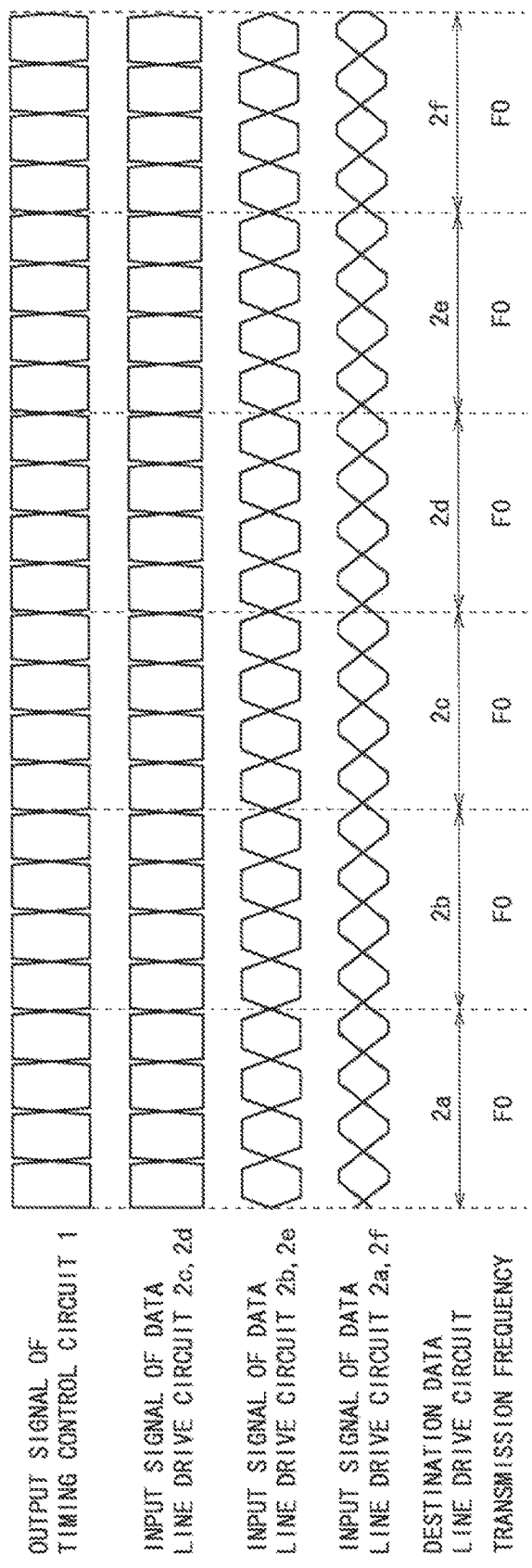
FIG. 4 is a waveform diagram of signals on a bus in a liquid crystal display device according to a comparative example.

FIG. 4 is a waveform diagram of signals on a bus in a liquid crystal display device according to a comparative example. Here, in order to facilitate comparison, it is assumed that the liquid crystal display device according to the comparative example has a same configuration as in FIG. 2. In the liquid crystal display device according to the comparative example, a transmission frequency is determined to have a value F0 so that the data line drive circuits 2a, 2f having the longest transmission distance L can receive the video data correctly. In the liquid crystal display device according to the comparative example, the same transmission frequency F0 is used when sending the video data to the data line drive circuits 2b to 2e.

In the liquid crystal display device according to the comparative example (FIG. 4), the transmission frequency F0 determined so that the video data can be received correctly even when the transmission distance L is the longest is always used. On the other hand, in the liquid crystal display device according to the present embodiment (FIG. 3), the low transmission frequency F1 is used when the transmission distance L is long, whereas the high transmission frequency F3 is used when the transmission distance L is short. Thus, in the liquid crystal display device according to the present embodiment, an average value of the transmission frequency is higher and time required to transmit the video data VD is shorter compared to the liquid crystal display device according to the comparative example. Therefore, according to the liquid crystal display device according to the present embodiment, the video data VD can be transmitted at higher speed than in the liquid crystal display device according to the comparative example.

In the above description, the timing control circuit 1 increases the transmission frequency as the transmission distance L is shorter, and decreases the transmission frequency as the transmission distance L is longer. Alternatively, the timing control circuit 1 may decrease a transmission signal amplitude as the transmission distance L is shorter, and may increase the transmission signal amplitude as the transmission distance L is longer. With this, it is possible to reduce an average value of the transmission signal amplitude and transmit the video data VD with low power consumption. Furthermore, the timing control circuit 1 may increase the transmission frequency and decrease the transmission signal amplitude as the transmission distance L is shorter, and may decrease the transmission frequency and increase the transmission signal amplitude as the transmission distance L is longer. With this, the video data VD can be transmitted at high speed with low power consumption.

Furthermore, the timing control circuit 1 may decrease a phase difference between the clock signal and the data signal on the bus as the transmission distance L is shorter, and may increase the phase difference as the transmission distance L is longer. Furthermore, the timing control circuit 1 may decrease a degree of pre-emphasis applied during transmission as the transmission distance L shorter, and may increase the degree as the transmission distance L is longer. Even in the liquid crystal display devices thus configured, when sending the video data VD, it is possible to select a suitable transmission condition in accordance with the transmission distance L and transmit the video data VD in a suitable manner.

As described above, the liquid crystal display device according to the present embodiment includes a display panel (liquid crystal panel 3) having the plurality of the data lines S1 to Sn, a control circuit (timing control circuit 1) for sending the video data VD, and the plurality of the data line drive circuits 2a to 2f for driving the data lines S1 to Sn based on the video data VD received from the control circuit. The control circuit and the data line drive circuits 2a to 2f are connected in a multi-drop manner. The control circuit changes a transmission condition in accordance with the transmission distance L between the control circuit and a destination data line drive circuit when sending the video data VD. Therefore, when transmitting the video data VD from the control circuit to the data line drive circuits 2a to 2f, it is possible to select a suitable transmission condition in accordance with the transmission distance L and transmit the video data VD in a suitable manner.

The control circuit increases the transmission frequency as the transmission distance L is shorter when sending the video data VD. With this, it is possible to increase the average value of the transmission frequency and transmit the video data VD at high speed. The control circuit may decrease the transmission signal amplitude as the transmission distance L is shorter when sending the video data VD. With this, it is possible to reduce the average value of the transmission signal amplitude and transmit the video data VD with low power consumption. Furthermore, the data line drive circuits 2a to 2f are arranged along one side of the display panel, and the control circuit sends the video data VD in accordance with the arrangement order of the data line drive circuits 2a to 2f. The control circuit which sequentially changes the transmission condition in accordance with the transmission distance can be configured easily. Furthermore, the control circuit changes the transmission condition with respect to one data line drive circuit. With this, since transmission can be performed under a constant transmission condition for the data line drive circuit, an optimum transmission condition can be set for each data line drive circuit. Furthermore, the control circuit which changes the transmission condition with respect to one data line drive circuit can be configured easily.

Second Embodiment

A liquid crystal display device according to a second embodiment of the present invention has a same configuration (FIG. 1) as the liquid crystal display device according to the first embodiment. Differences from the first embodiment will be described below.

Figure 5:
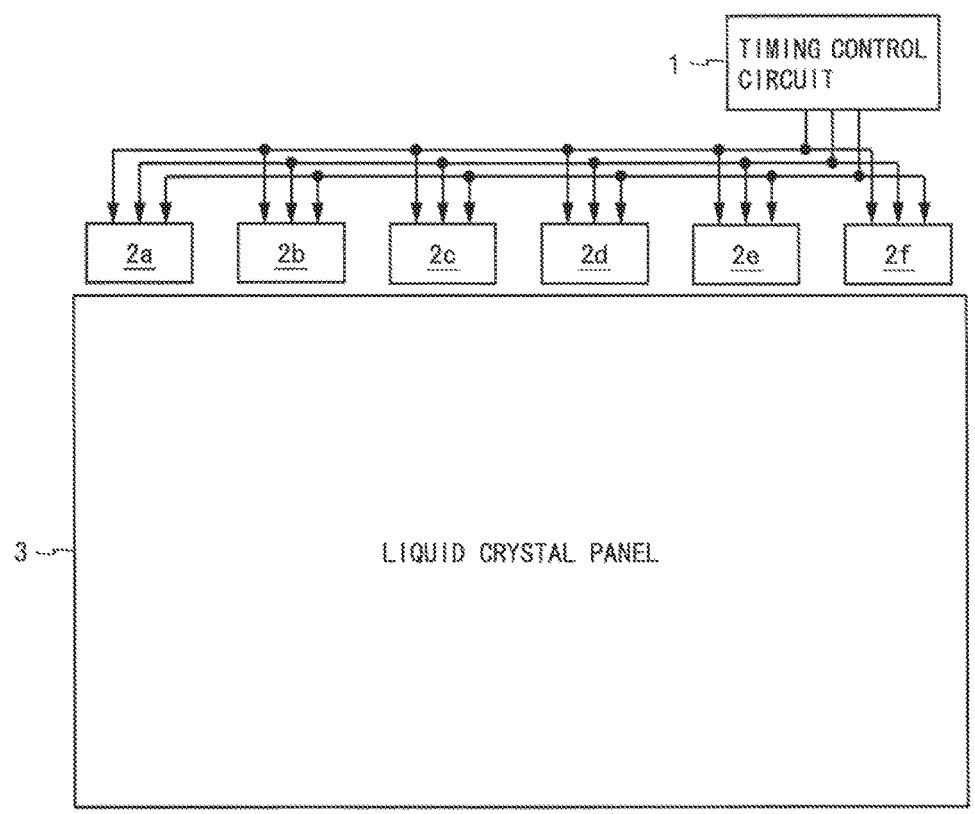
FIG. 5 is a diagram showing a connection form of a timing control circuit and data line drive circuits in a liquid crystal display device according to a second embodiment.

FIG. 5 is a diagram showing a connection form of the timing control circuit 1 and the data line drive circuit 2 in the liquid crystal display device according to the present embodiment. In FIG. 5, the timing control circuit 1 is arranged at a position away from the symmetry axis (not shown) of the liquid crystal panel 3. Among the data line drive circuits 2a to 2f, the data line drive circuit 2f has a shortest transmission distance L, and the data line drive circuit 2a has a longest transmission distance L.

Figure 6:
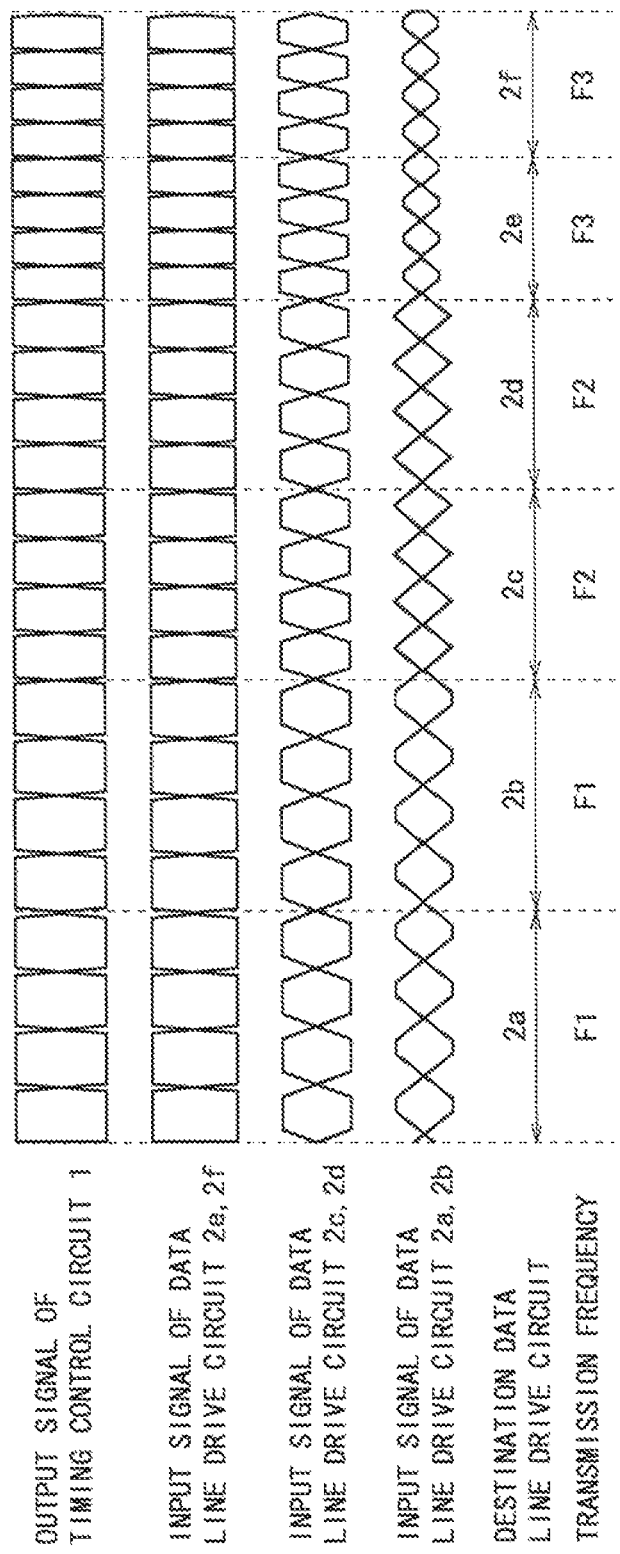
FIG. 6 is a waveform diagram of signals on a bus in the liquid crystal display device according to the second embodiment.

FIG. 6 is a waveform diagram of signals on the bus in the liquid crystal display device according to the present embodiment. In FIG. 6, as in FIG. 4, the timing control circuit 1 increases the transmission frequency as the transmission distance L is shorter, and decreases the transmission frequency as the transmission distance L is longer. Specifically, the timing control circuit 1 sets the transmission frequency to a low value F1, when sending the video data VD to the data line drive circuit 2a having the longest transmission distance L or the data line drive circuit 2b having a second longest transmission distance L. The timing control circuit 1 sets the transmission frequency to a value F3 higher than F1, when sending the video data VD to the data line drive circuit 2f having the shortest transmission distance L or the data line drive circuit 2e having a second shortest transmission distance L. The timing control circuit 1 sets the transmission frequency to a value F2 between F1 and F3 (F1<F2<F3), when sending the video data VD to the remaining data line drive circuit 2c or 2d. In this manner, the timing control circuit 1 changes the transmission condition monotonously within one horizontal period. Furthermore, the timing control circuit 1 changes the transmission frequency with respect to two data line drive circuits.

In FIG. 6, the timing control circuit 1 uses the same transmission frequency F1 when sending the video data VD to the data line drive circuit 2a or 2b. However, as shown in FIG. 5, the data line drive circuit 2b has a shorter transmission distance L than the data line drive circuit 2a. Thus, the timing control circuit 1 may set the transmission frequency used when sending the video data VD to the data line drive circuit 2b higher than the transmission frequency used when sending the video data VD to the data line drive circuit 2a. Similarly, the timing control circuit 1 may set the transmission frequency used when sending the video data VD to the data line drive circuit 2d higher than the transmission frequency used when sending the video data VD to the data line drive circuit 2c. Furthermore, the timing control circuit 1 may set the transmission frequency used when sending the video data VD to the data line drive circuit 2f higher than the transmission frequency used when sending the video data VD to the data line drive circuit 2e.

According to the liquid crystal display device according to the present embodiment, even when the timing control circuit 1 is arranged at a position apart from the symmetry axis of the liquid crystal panel 3, the video data VD can be transmitted at high speed, as with the first embodiment. Furthermore, it is possible to prevent the transmission condition from changing abruptly within one horizontal period by changing the transmission condition (transmission frequency) monotonously within one horizontal period. Furthermore, a control circuit which changes the transmission condition monotonously within one horizontal period can be configured easily.

Third Embodiment

A liquid crystal display device according to a third embodiment of the present invention has a same configuration (FIG. 1) as the liquid crystal display device according to the first embodiment. However, the liquid crystal display device according to the present embodiment includes a timing control circuit 11 and a data line drive circuit 12 shown in FIG. 7 in place of the timing control circuit 1 and the data line drive circuit 2. Differences from the first and second embodiments will be described below.

Figure 7:
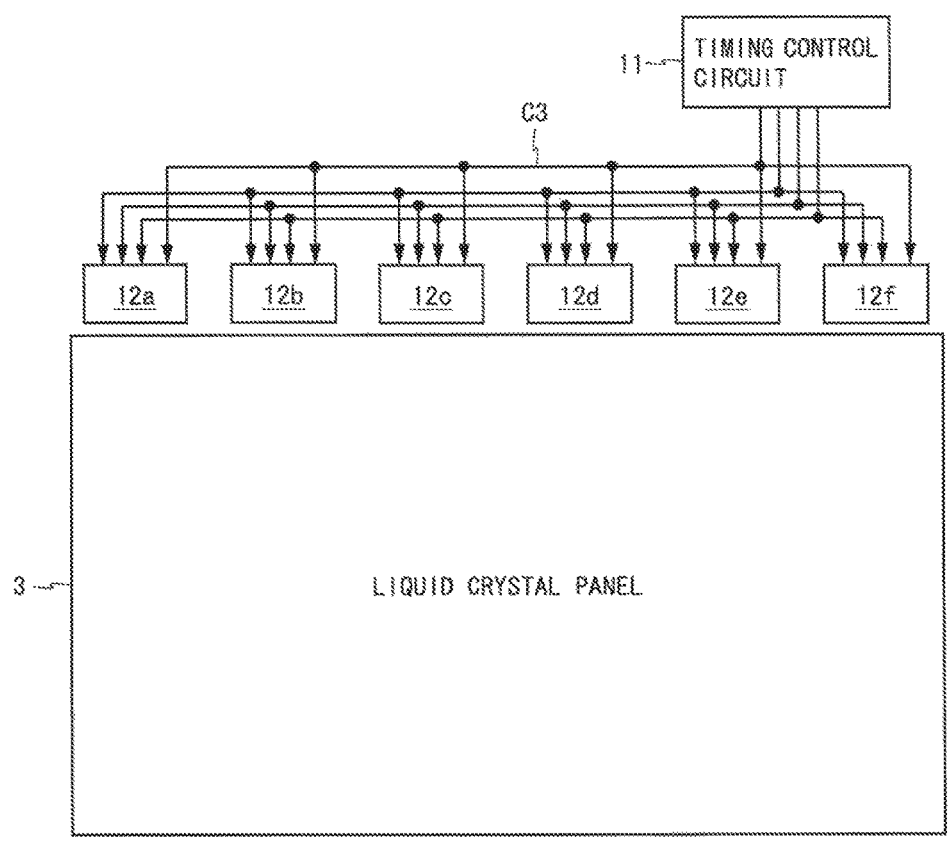
FIG. 7 is a diagram showing a connection form of a timing control circuit and data line drive circuits in a liquid crystal display device according to a third embodiment.

FIG. 7 is a diagram showing a connection form of the timing control circuit 11 and the data line drive circuit 12. As shown in FIG. 7, the data line drive circuit 12 consists of six data line drive circuits 12a to 12f, each being a semiconductor chip. The timing control circuit 11 and the data line drive circuits 12a to 12f are arranged at positions similar to those in the second embodiment.

The timing control circuit 11 outputs a scan direction control signal C3 indicating a sending order of the video data VD, to the data line drive circuits 12a to 12f. In an odd-numbered horizontal period, the timing control circuit 11 outputs a low-level scan direction control signal C3. At this time, the timing control circuit 11 sends the video data VD in an ascending order (in order of 12a, 12b, . . . , 12e, 12f) in accordance with an arrangement order of the data line drive circuits 12a to 12f. In an even-numbered horizontal period, the timing control circuit 11 outputs a high-level scan direction control signal C3. At this time, the timing control circuit 11 sends the video data VD in a descending order (in order of 12f, 12e, . . . , 12b, 12a) in accordance with the arrangement order of the data line drive circuits 12a to 12f.

Figure 8:
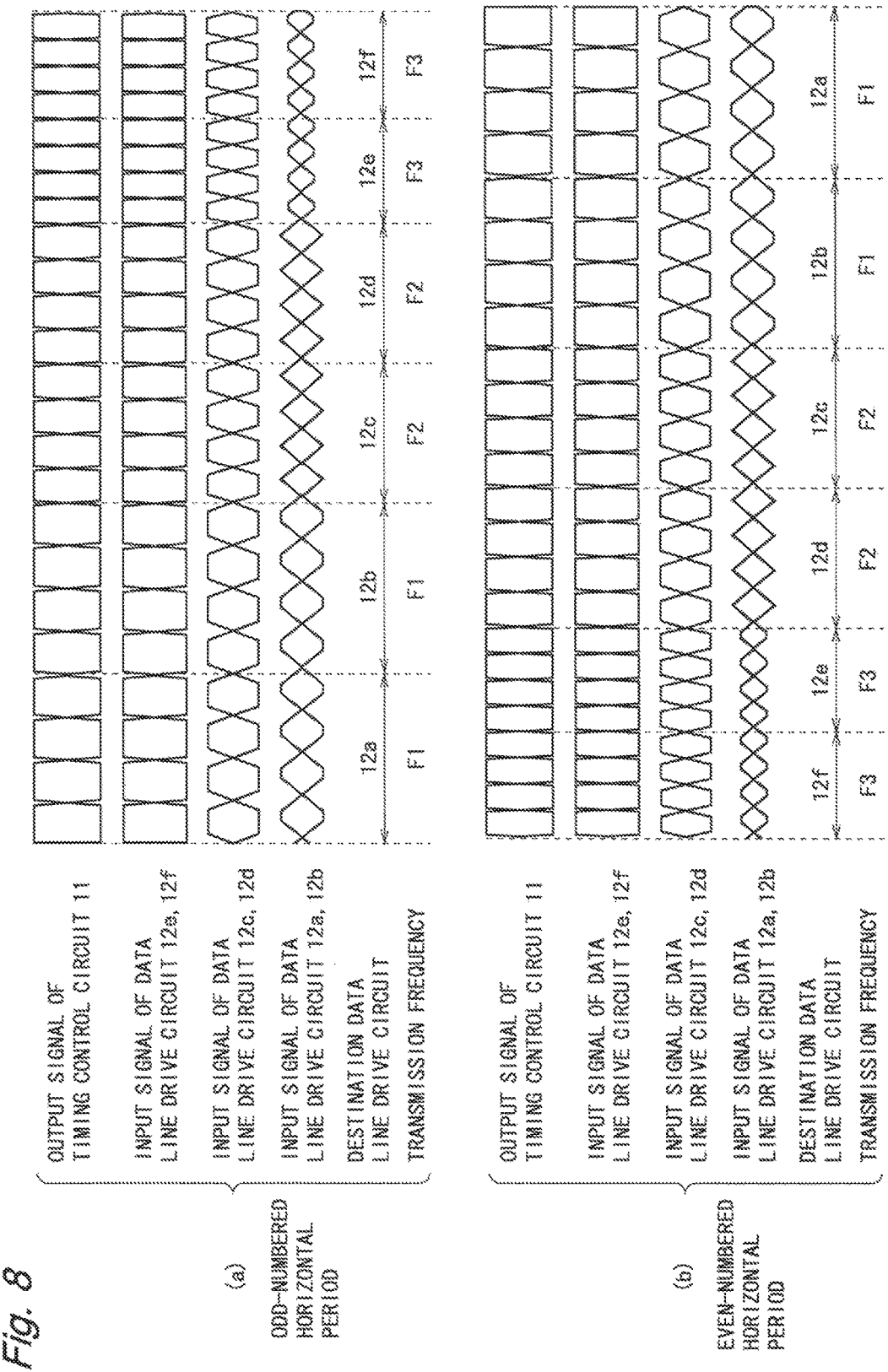
FIG. 8 is a waveform diagram of signals on a bus in the liquid crystal display device according to the third embodiment.

FIG. 8 is a waveform diagram of signals on the bus in the liquid crystal display device according to the present embodiment. FIG. 8(a) shows signal waveforms in the odd-numbered horizontal period, and FIG. 8(b) shows the signal waveform in the even-numbered horizontal period. In the present embodiment, as in the first and second embodiments, the timing control circuit increases the transmission frequency as the transmission distance L is shorter, and decreases the transmission frequency as the transmission distance L is longer. Specifically, the timing control circuit 11 sets the transmission frequency to a low value F1 when sending the video data VD to the data line drive circuit 12a or 12b. The timing control circuit 11 sets the transmission frequency to a value F3 higher than F1 when sending the video data VD to the data line drive circuit 12e or 12f. The timing control circuit 11 sets the transmission frequency to a value F2 between F1 and F3 (F1<F2<F3) when sending the video data VD to the data line drive circuit 12c or 12d. In this manner, the timing control circuit 11 changes the transmission frequency with respect to two data line drive circuits.

The timing control circuit 11 switches a level of the scan direction control signal C3 every horizontal period, and reverses the sending order of the video data VD every horizontal period. In the odd-numbered horizontal period (FIG. 8(a)), the video data VD is sent sequentially, firstly to the data line drive circuit 12a having the longest transmission distance L and lastly to the data line drive circuit 12f having the shortest transmission distance L. Therefore, the transmission frequency increases sequentially in the odd-numbered horizontal period. On the other hand, in the even-numbered horizontal period (FIG. 8(b)), the video data VD is sent sequentially, firstly to the data line drive circuit 12f having the shortest transmission distance L and lastly to the data line drive circuit 12a having the longest transmission distance L. Therefore, the transmission frequency decreases sequentially in the even-numbered horizontal period.

Figure 9:
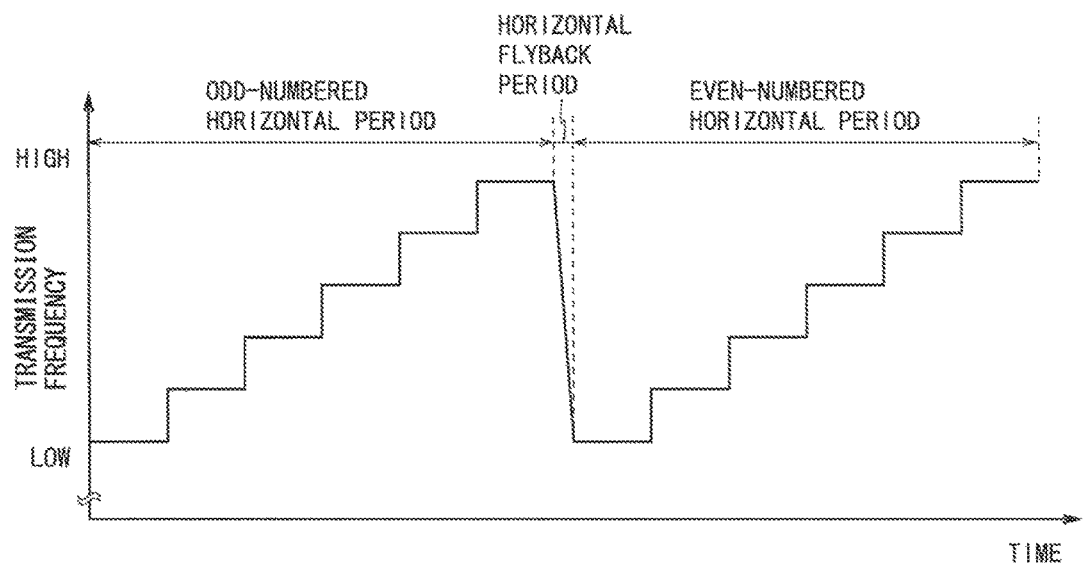
FIG. 9 is a diagram showing changes of a transmission frequency in the liquid crystal display device according to the second embodiment.

Effects of the liquid crystal display device according to the present embodiment will be described, referring to FIGS. 9 and 10. Here, for convenience of explanation, it is assumed that the timing control circuit changes the transmission frequency in six levels within one horizontal period. FIG. 9 is a diagram showing changes of the transmission frequency in the liquid crystal display device according to the second embodiment. In the second embodiment, the sending order of the video data VD is the same in the odd-numbered horizontal period and the even-numbered horizontal period. Therefore, the transmission frequency increases stepwise in any horizontal period, and changes abruptly from a highest value to a lowest value in a horizontal flyback period. Thus, in the liquid crystal display device according to the second embodiment, noise may be generated or EMI (Electro-Magnetic Inference) may deteriorate due to an abrupt change of the transmission frequency. Furthermore, clock design of the timing control circuit 1 may become difficult.

Figure 10:
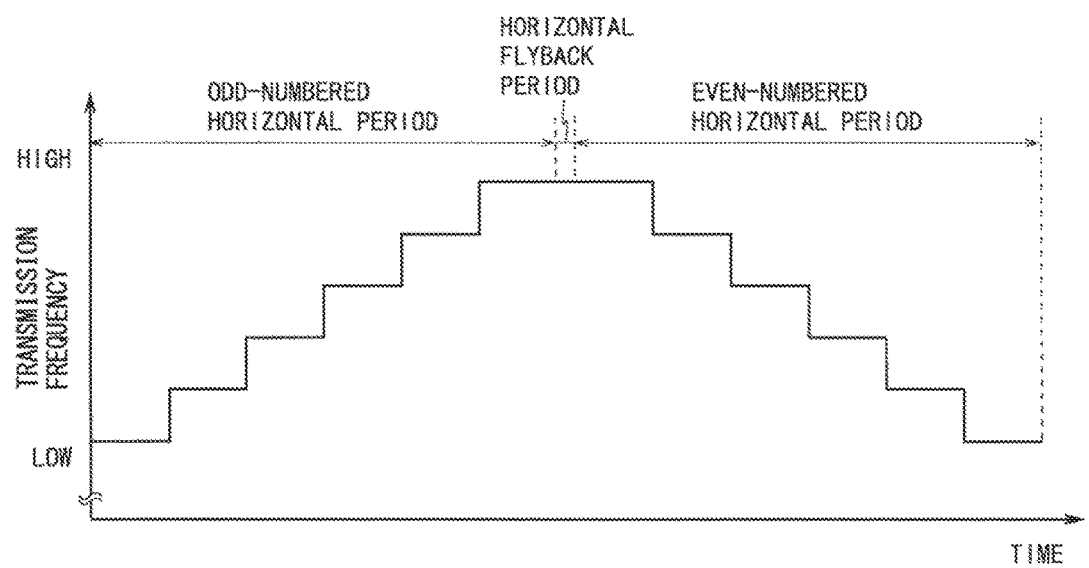
FIG. 10 is a diagram showing changes of a transmission frequency in the liquid crystal display device according to the third embodiment.

FIG. 10 is a diagram showing changes of the transmission frequency in the liquid crystal display device according to the present embodiment. In the present embodiment, the sending order of the video data VD is opposite between the odd-numbered horizontal period and the even-numbered horizontal period. Thus, the transmission frequency increases stepwise in the odd-numbered horizontal period and decreases stepwise in the even-numbered horizontal period. The transmission frequency keeps a high value in the horizontal flyback period after the odd-numbered horizontal period and keeps a low value in the horizontal flyback period after the even-numbered horizontal period. Therefore, according to the liquid crystal display device according to the present embodiment, it is possible to prevent the transmission frequency from changing abruptly. Therefore, generation of noise and deterioration of EMI can be prevented, and clock design of the timing control circuit 11 can be performed easily.

The timing control circuit 11 changes the transmission frequency with respect to two data line drive circuits in FIG. 8, and changes the transmission frequency with respect to one data line drive circuit in FIG. 10. In general, the timing control circuit 11 may change the transmission frequency with respect to one or more data line drive circuits. Furthermore, the timing control circuit 11 may change the transmission frequency while sending the video data VD to one data line drive circuit.

Figure 11:
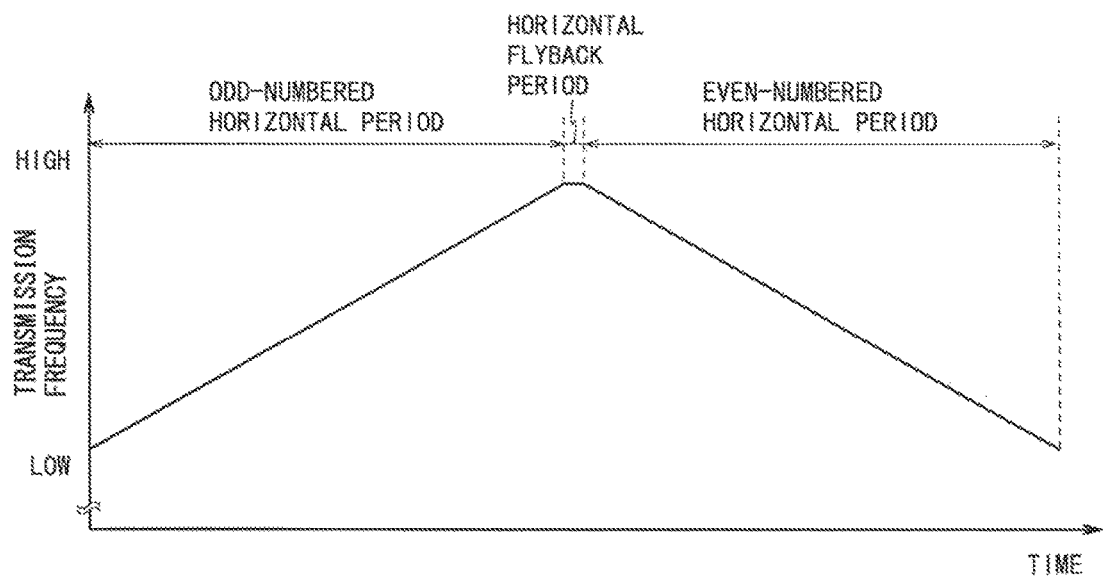
FIG. 11 is a diagram showing changes of a transmission frequency in a liquid crystal display device according to a variant of the third embodiment.
Figure 12:
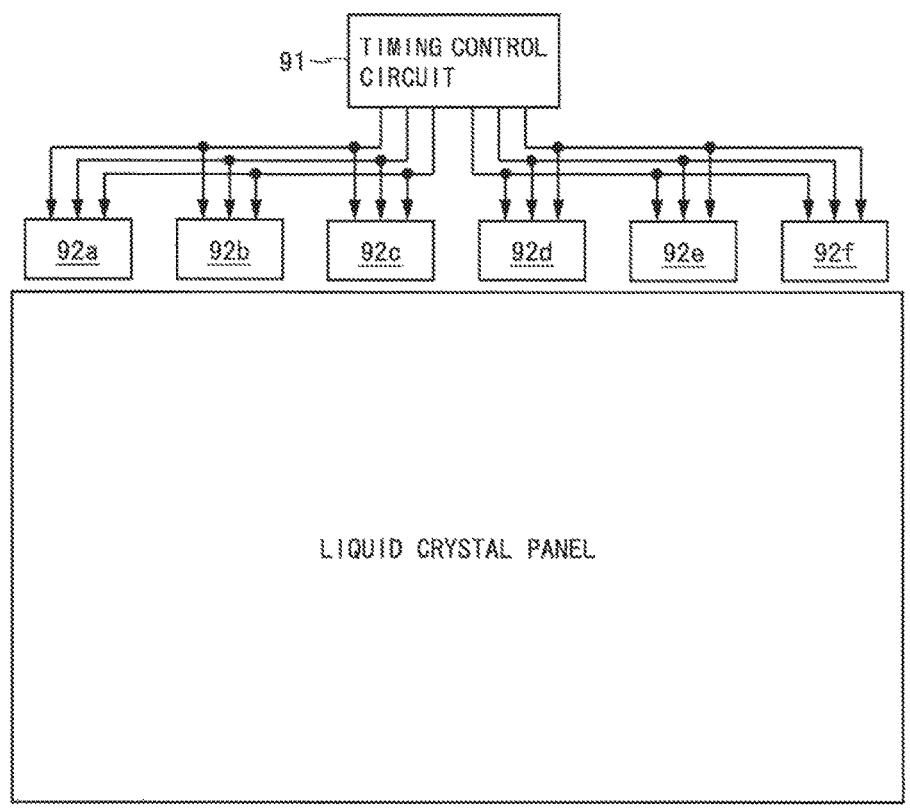
FIG. 12 is a diagram showing a connection form of a timing control circuit and data line drive circuits in a conventional liquid crystal display device.
Figure 13:
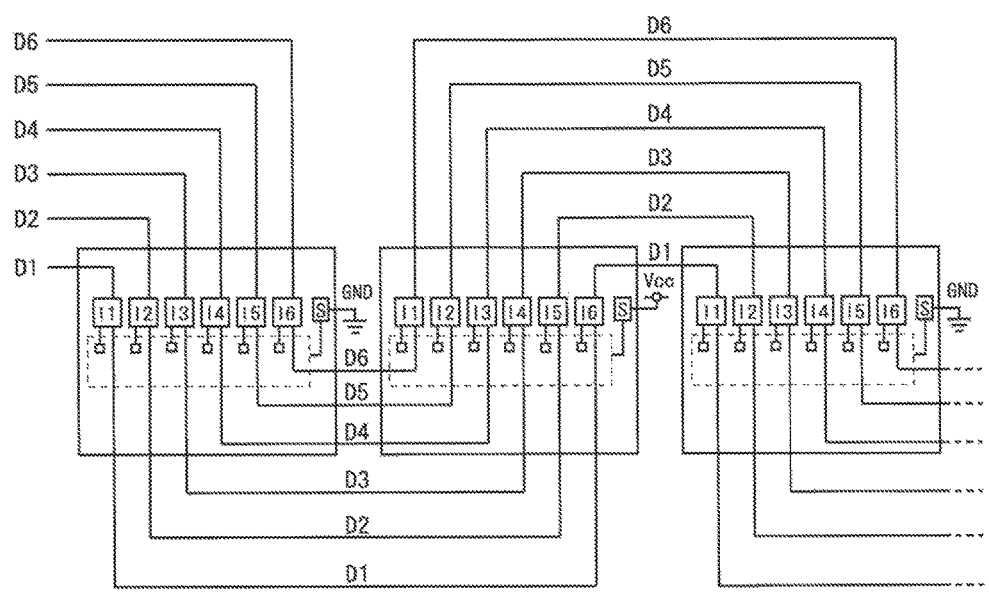
FIG. 13 is a diagram showing a connection form of source drivers in a conventional display device.

FIG. 11 is a diagram showing changes of the transmission frequency in a liquid crystal display device according to a variant of the present embodiment. In the liquid crystal display device according to the variant, the timing control circuit 11 increases the transmission frequency continuously in the odd-numbered horizontal period and decreases the transmission frequency continuously in the even-numbered horizontal period. The video data VD can be transmitted in a more suitable manner by changing the transmission frequency in multi-stage (or continuously). For example, effects of frequency spreading can be enhanced.

As described above, in the liquid crystal display device according to the present embodiment, the data line drive circuits 12a to 12f are arranged along one side of a display panel (liquid crystal panel 3), and a control circuit (timing control circuit 11) sends the video data VD in accordance with the arrangement order of the data line drive circuits 12a to 12f. The control circuit reverses the sending order of the video data VD every horizontal period. Therefore, it is possible to prevent the transmission condition (transmission frequency) from abruptly changing in the horizontal flyback period.

Furthermore, in the liquid crystal display device according to the variant of the present embodiment, the control circuit changes the transmission condition while sending the video data VD to one data line drive circuit. Therefore, it is possible to change the transmission condition in multi-stage and transmit the video data VD in a more suitable manner.

As for the liquid crystal display devices according to the embodiments of the present invention, various types of variants can be configured. For example, in the liquid crystal display device according to the second or third embodiment, the timing control circuit may change the transmission condition other than the transmission frequency (transmission signal amplitude, phase difference between clock signal and data signal, degree of pre-emphasis, or the like) in accordance with the transmission distance L when sending the video data VD. Furthermore, a number of the data line drive circuits included in the liquid crystal display device may be arbitrary, as long as it is not less than two. Furthermore, the sending order of the video data VD may be other than the arrangement order of the data line drive circuits. Furthermore, the liquid crystal display device may include one bus, or may include two or more buses in order to transmit the video data VD from the timing control circuit to the data line drive circuits. Furthermore, a circuit sending the video data VD to the data line drive circuits may be a control circuit other than the timing control circuit. Furthermore, the liquid crystal display device may transmit the video data VD according to a system other than the mini-LVDS.

Furthermore, by arbitrarily combining features of the liquid crystal display devices according to the first to third embodiments and their variants, unless contrary to the nature thereof, liquid crystal display devices having the features of the liquid crystal display devices according to the plurality of embodiments and variants can be configured. Furthermore, the present invention can be applied to a display device other than the liquid crystal display device, the display device including a control circuit and a plurality of data line drive circuits connected in a multi-drop manner.

INDUSTRIAL APPLICABILITY

Since the display device of the present invention has a feature that can transmit a video data in a suitable manner, it can be used as various display devices including a control circuit and a plurality of data line drive circuits connected in a multi-drop manner, such as a liquid crystal display device.

DESCRIPTION OF REFERENCE CHARACTERS 1, 11: TIMING CONTROL CIRCUIT
2, 12: DATA LINE DRIVE CIRCUIT
3: LIQUID CRYSTAL PANEL
4: SCANNING LINE DRIVE CIRCUIT
5: BACKLIGHT

The invention claimed is:
1. A display device comprising:
a display panel having a plurality of data lines;
a control circuit configured to send video data; and
a plurality of data line drive circuits configured to drive the data lines based on the video data received from the control circuit, wherein
the control circuit and the data line drive circuits are connected in a multi-drop manner,
the control circuit is configured to change a transmission condition in accordance with a transmission distance between the control circuit and a destination data line drive circuit when sending the video data,
the data line drive circuits are arranged along one side of the display panel, and
the control circuit is configured
to send the video data in accordance with an arrangement order of the data line drive circuits,
to change the transmission condition monotonously within one horizontal period, and
to reverse a sending order of the video data every horizontal period.

2. The display device according to claim 1, wherein the control circuit is configured to increase a transmission frequency as the transmission distance is shorter when sending the video data.

3. The display device according to claim 1, wherein the control circuit is configured to decrease a transmission signal amplitude as the transmission distance is shorter when sending the video data.

4. The display device according to claim 1, wherein the control circuit is configured to change the transmission condition with respect to one or more data line drive circuits.

5. The display device according to claim 1, wherein the control circuit is configured to change the transmission condition while sending the video data to one data line drive circuit.

6. The display device according to claim 1, wherein the display panel is a liquid crystal panel.

7. A drive method for a display device including a display panel having a plurality of data lines, and a control circuit and a plurality of data line drive circuits connected in a multi-drop manner, the method comprising the step of:
sending video data from the control circuit;
receiving the video data by the data line drive circuits; and
driving the data lines based on the video data received by the data line drive circuits, wherein
in the sending, a transmission condition is changed in accordance with a transmission distance between the control circuit and a destination data line drive circuit,
the data line drive circuits are arranged along one side of the display panel, and
in the sending,
the video data is sent in accordance with an arrangement order of the data line drive circuits,
the transmission condition is changed monotonously within one horizontal period, and
a sending order of the video is reversed every horizontal period.

8. The display device according to claim 2, wherein the control circuit is configured to decrease a transmission signal amplitude as the transmission distance is shorter when sending the video data.

* * * * *